(12) United States Patent
Hoemann et al.

(10) Patent No.: US 10,910,895 B2
(45) Date of Patent: Feb. 2, 2021

(54) ELECTRIC MOTOR WITH V-SLOT ROTOR

(71) Applicant: Nidec Motor Corporation, St. Louis, MO (US)

(72) Inventors: Keith I. Hoemann, Fenton, MO (US); Lunjie Lu, Chesterfield, MO (US); Michael W. Major, Moro, IL (US)

(73) Assignee: Nidec Motor Corporation, St. Louis, MO (US)

( * ) Notice: Subject to any disclaimer, the term of this patent is extended or adjusted under 35 U.S.C. 154(b) by 113 days.

(21) Appl. No.: 16/240,383

(22) Filed: Jan. 4, 2019

(65) Prior Publication Data

US 2019/0214862 A1 Jul. 11, 2019

Related U.S. Application Data

(60) Provisional application No. 62/614,148, filed on Jan. 5, 2018.

(51) Int. Cl.
| | |
|---|---|
| *H02K 21/12* | (2006.01) |
| *H02K 1/27* | (2006.01) |
| *H02K 1/12* | (2006.01) |
| *H02K 21/16* | (2006.01) |

(52) U.S. Cl.
CPC ............... *H02K 1/276* (2013.01); *H02K 1/12* (2013.01); *H02K 1/2766* (2013.01); *H02K 21/16* (2013.01); *H02K 2201/06* (2013.01); *H02K 2213/03* (2013.01)

(58) Field of Classification Search
CPC ...... H02K 1/276; H02K 1/2766; H02K 21/16; H02K 2201/06; H02K 2213/03
USPC ............ 310/156.38, 156.45–156.46, 156.53, 310/156.56
See application file for complete search history.

(56) References Cited

U.S. PATENT DOCUMENTS

| | | | | |
|---|---|---|---|---|
| 6,525,442 | B2* | 2/2003 | Koharagi | H02K 1/2766 310/156.45 |
| 7,151,335 | B2* | 12/2006 | Tajima | H02K 1/2766 310/156.48 |
| 8,008,825 | B2 | 8/2011 | Suzuki et al. | |
| 2004/0095034 | A1* | 5/2004 | Popov | H02K 1/2766 310/156.56 |
| 2004/0256940 | A1* | 12/2004 | Tsuruta | H02K 1/276 310/156.53 |
| 2007/0126305 | A1* | 6/2007 | Okuma | H02K 1/2766 310/156.53 |
| 2008/0224558 | A1 | 9/2008 | Ionel | |
| 2010/0026128 | A1 | 2/2010 | Ionel | |
| 2010/0213781 | A1 | 8/2010 | Rahman et al. | |
| 2014/0333168 | A1 | 11/2014 | Bouarroudj et al. | |

* cited by examiner

*Primary Examiner* — Thanh Lam
(74) *Attorney, Agent, or Firm* — Hovey Williams LLP

(57) ABSTRACT

An electric motor includes a stator and a rotor rotatable relative to the stator. The rotor includes a plurality of poles, each of which is defined by a pair of magnets positioned relative to each other in a V-shaped arrangement having a vertex positioned radially inward. Each of the poles includes a mechanical pole angle defined by the pair of magnets. The mechanical pole angle is about one-half of three hundred and sixty divided by the number of the poles of the rotor.

20 Claims, 7 Drawing Sheets

ELECTRIC MOTOR WITH V-SLOT ROTOR

CROSS-REFERENCE TO RELATED APPLICATION

Priority Application

The present application claims priority from U.S. Provisional Patent Application No. 62/614,148, filed Jan. 5, 2018, the entire disclosure of which is hereby incorporated by reference herein.

Contemporaneously Filed Applications

The present application is filed contemporaneously with U.S. patent application Ser. No. 16/240,397, entitled ROTOR HAVING LONGITUDINAL RECESSES IN OUTER SURFACE BETWEEN V-SLOT POLES, filed Jan. 4, 2019, the entire disclosure of which is hereby incorporated by reference herein.

BACKGROUND

The embodiments described herein relate generally to electric motors, and more particularly, to electric motors including a v-slot rotor.

Permanent magnet rotors utilizing a V-slot design are known. The V-slots facilitate increasing a volume of magnets within a rotor pole. These designs are useful but typically result in increases in magnetic flux leakage through the interpolar area between the magnets of adjacent poles. A V-slot design also provides increased reluctance. While useful, there is a need for a rotor which provides a more constant power over a wide speed range for a given motor size and configuration, which may be dictated by physical constraints placed on the motor.

SUMMARY

In one aspect, an electric motor is provided. The electric motor includes a stator and a rotor rotatable relative to the stator. The rotor includes a plurality of poles. Each of the poles is defined by a pair of magnets positioned relative to each other in a V-shaped arrangement having a vertex positioned radially inward. Each of the poles includes a mechanical pole angle defined by the pair of magnets. The mechanical pole angle is about one-half (½) of three hundred and sixty (360) divided by the number of the poles.

In another aspect, an electric motor is provided. The electric motor includes a stator and a rotor rotatable relative to the stator. The rotor includes a plurality of poles, each of which is defined by a pair of magnets positioned relative to one another in a V-shaped arrangement with a vertex positioned radially inward. The V-shaped arrangement defines a mechanical pole angle. The rotor also includes first and second radial pole pitch lines defined between each pole and circumferentially adjacent first and second ones of the poles, such that the poles are arranged along a pole pitch angle defined between the first and second pole pitch lines. Each of the poles is centered relative to the first and second radial pole pitch lines, with the mechanical pole angle being less than about fifty-three percent (53%) of the pole pitch angle.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWINGS

Preferred embodiments of the invention are described in detail below with regard to the attached drawing figures, wherein.

Figure 1:
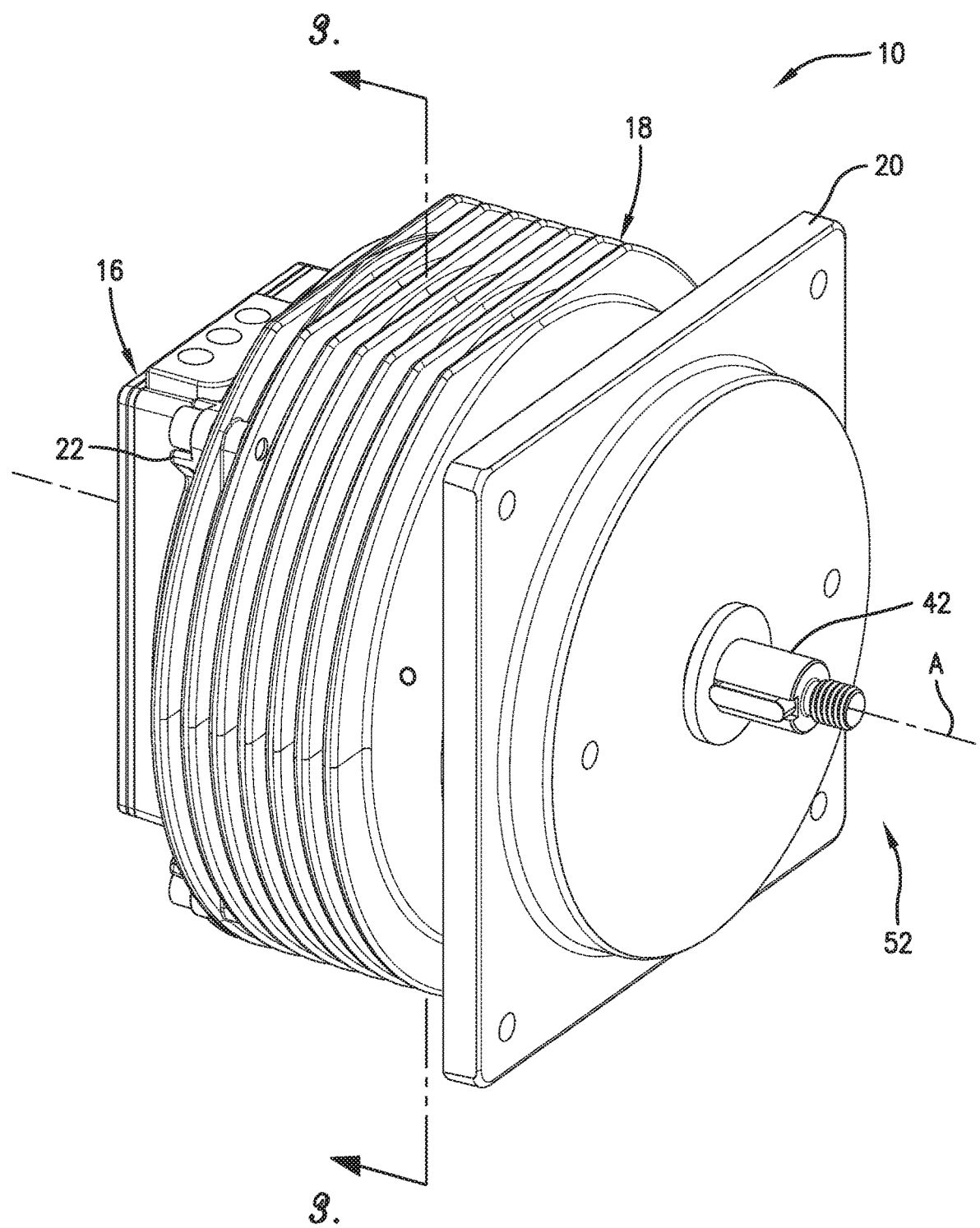
FIG. 1 is a perspective of an exemplary electric motor constructed in accordance with one embodiment of the invention.

The drawing figures do not limit the present invention to the specific embodiments disclosed and described herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying drawings. The embodiments are intended to describe aspects of the disclosure in sufficient detail to enable those skilled in the art to practice the disclosure. Other embodiments can be utilized, and changes can be made without departing from the scope of the claims. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and the claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

As used herein, the terms "axial" and "axially" refer to directions and orientations extending substantially parallel to a longitudinal axis of the electric motor. The terms "radial" and "radially" refer to directions and orientations extending substantially perpendicular to the longitudinal axis of the electric motor. In addition, as used herein, the terms "circumferential" and "circumferentially" refer to directions and orientations extending arcuately about the longitudinal axis of the electric motor. Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

In the exemplary embodiment, the electric motor 10 is illustrated as a brushless permanent magnet, inner rotor motor. As will be described, an inner rotor motor has magnets positioned radially-inward relative to windings, which act as the stator. However, according to some aspect of the present invention, the rotor may alternately be an outer rotor motor or dual rotor motor.

Figure 2:
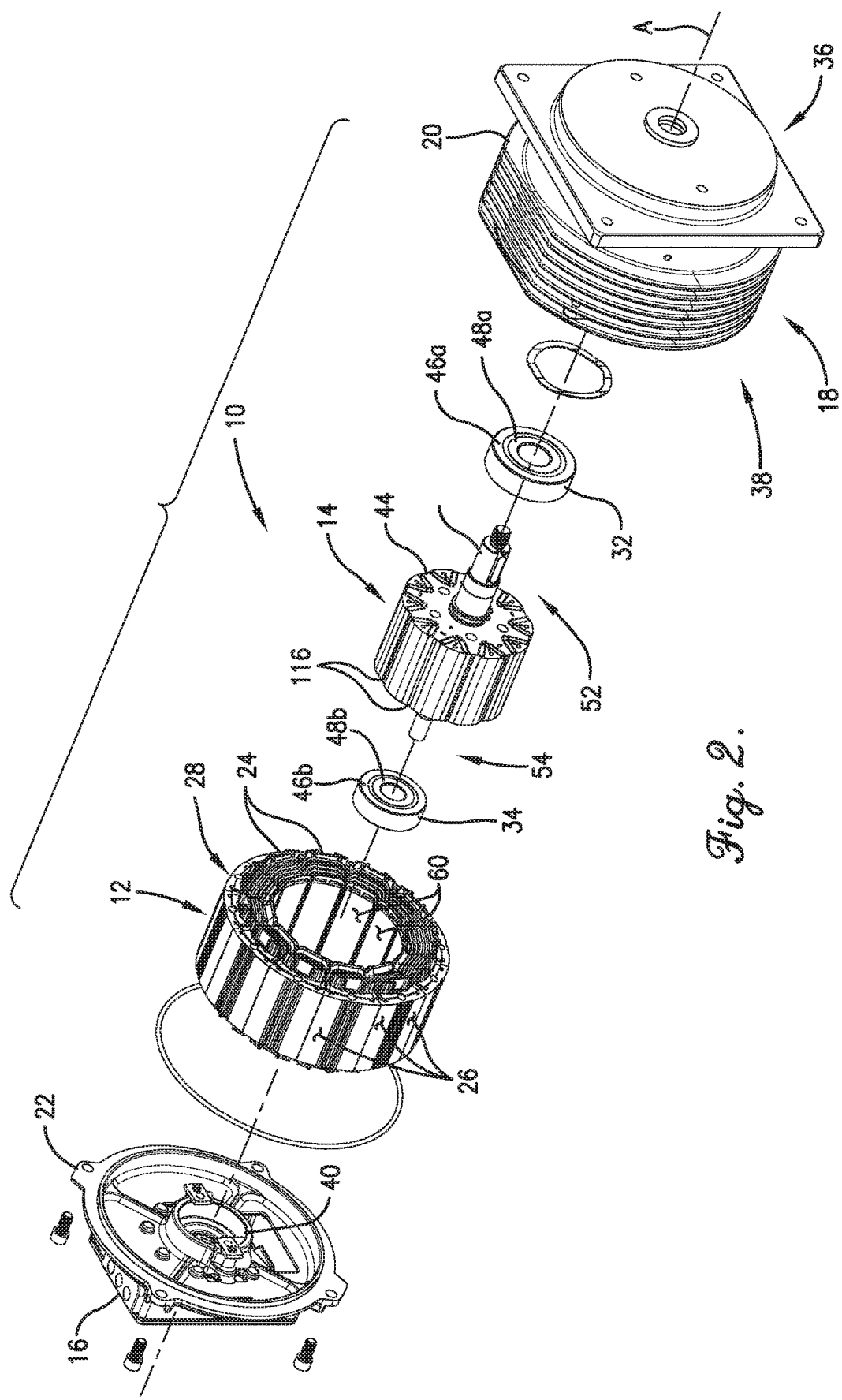
FIG. 2 is an exploded perspective view of electric motor shown in FIG. 1.
Figure 3:
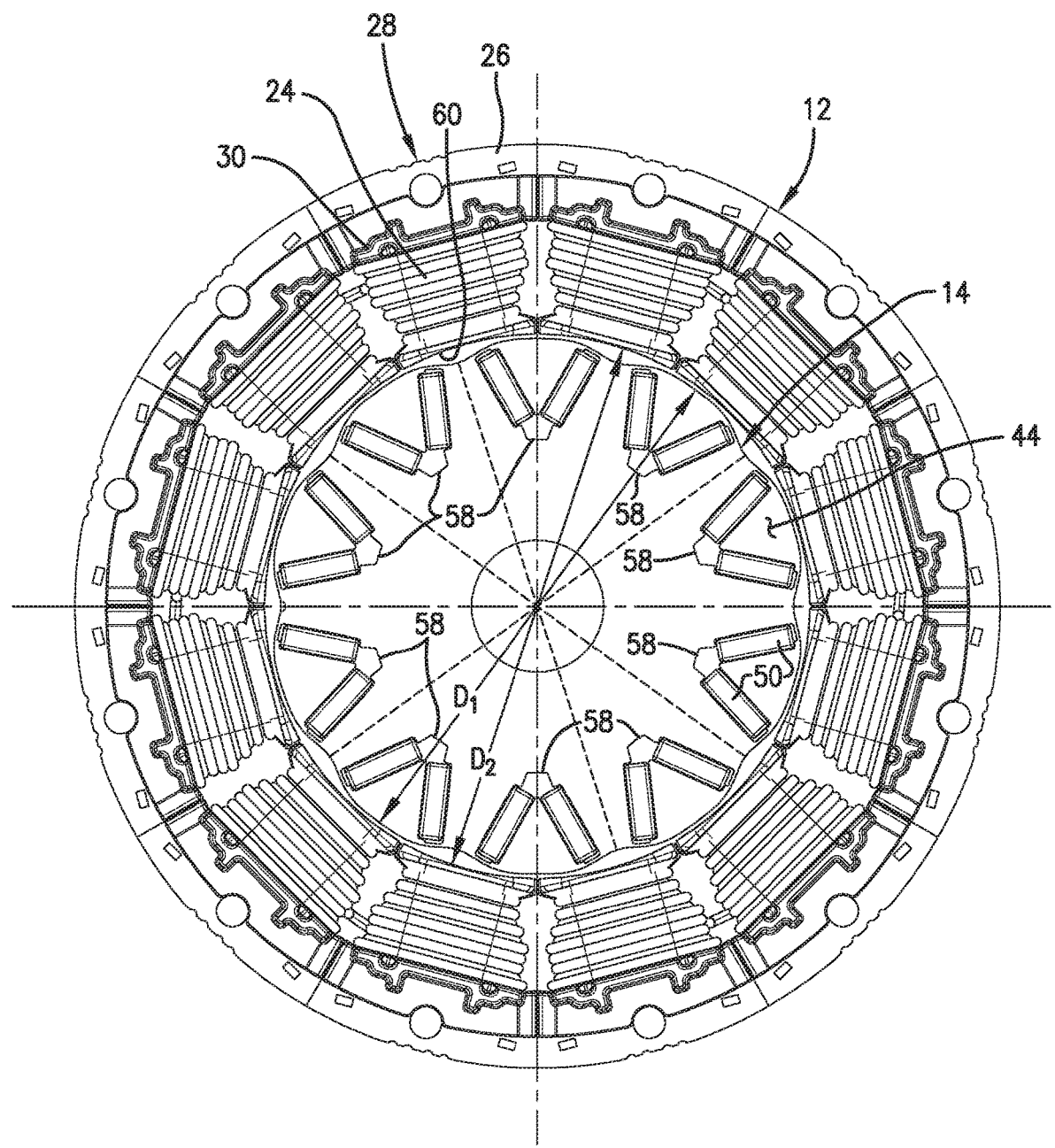
FIG. 3 is a cross-sectional view of the electric motor shown in FIGS. 1 and 2, taken along line 3-3 of FIG. 1.

As shown in FIGS. 1-3, the illustrated electric motor 10 generally includes a stator assembly 12, a rotor assembly 14 supported for rotation relative to the stator assembly 12, a controller housing 16 enclosing control electronics (not shown) for controlling operation of the electric motor 10, a housing 18 including a base portion 20 and an endshield 22, a first bearing assembly 32, and a second bearing assembly 34. The base portion 20 of the housing 18 is generally cylindrical in shape and includes a closed end 36 proximate the first bearing assembly 32 and an open end 38 opposite the closed end 36 for receiving at least a portion of the stator assembly 12 and the rotor assembly 14. The endshield 22 cooperates with the base portion 20 to substantially define a motor chamber in which the stator assembly 12 and the rotor assembly 14 are at least substantially housed. The controller housing 16 is coupled to the endshield 22 and encloses the control electronics and other various power and controller components of electric motor 10 therein. While the illustrated embodiment is one configuration of the electric motor 10, it is noted that electric motors of various configurations are contemplated, including, for example, electric motors having vented or otherwise open motor housings or shells, etc.

In the exemplary embodiment, the closed end 36 of the base portion 20 includes a first bearing support (not shown) sized and shaped to receive and secure the first bearing assembly 32 therein. For example, and without limitation, the first bearing support may include a recessed portion defined in the closed end 36. Alternatively, the first bearing support may be any structure or component configured to receive and secure the first bearing assembly 32 and that enables the electric motor 10 to function as described herein.

The endshield 22 includes a second bearing support 40 defined therein and positioned substantially in a center of the endshield 22 such that it is aligned axially with the first bearing support and concentric with the rotation axis "A." The second bearing support 40 is sized and shaped to receive and secure the second bearing assembly 34 therein. For example, and without limitation, as shown in FIG. 1, the second bearing support 40 is a recessed portion or bearing cup defined in the endshield 22. Alternatively, the second bearing support 40 is any structure or component, such as an aperture, configured to receive and secure the second bearing assembly 34 and that enables the electric motor 10 to function as described herein.

The first bearing assembly 32 and the second bearing assembly 34 are configured to rotatably support the rotor assembly 14. In particular, the rotor assembly 14 preferably includes a rotor shaft 42 fixedly supporting a rotor core 44 with the rotor shaft 42 extending axially through each of the bearing assemblies 32 and 34. In the exemplary embodiment, each of bearing assemblies 32 and 34 is a ball bearing assembly including a plurality of steel balls (not shown) positioned between outer races 46a and 46b and inner races 48a and 48b, respectively. The outer races 46a and 46b of the first and second bearing assemblies 32 and 34 are fixedly coupled to the first and second bearing supports, respectively. The inner races 48a and 48b are fixedly coupled to the rotor shaft 42 and are configured to rotate relative to the outer races 46a and 46b via the interposed steel balls. In alternative embodiments, the first and second bearing assemblies can be any type of bearing and/or bearing assembly that enables the electric motor 10 to function as described herein, such as, without limitation, sleeve bearings, plain bearings, fluid bearings, and/or active magnetic bearings.

As best shown in FIG. 3, in the exemplary embodiment, the stator assembly 12 is a three-phase stator assembly having twelve slots. In accordance with certain aspects of the present invention, the stator assembly 12 can alternatively be configured as a single phase or different multiphase motor and can have an alternative number of slots. In the exemplary embodiment, the stator assembly 12 is a segmented stator that includes a plurality of stator segment assemblies 28 combined to form the segmented stator assembly 12. Each of the stator segment assemblies 28 includes a toothed core 26, axially-opposite insulators 30, and a winding 24. The windings 24 are configured to be electrically energized to generate an electromagnetic field. The windings 24 are fabricated from wire (e.g., aluminum or copper) coiled or otherwise wound around the teether of the toothed core 26. The insulators 30 surround the toothed core 26 and are positioned between the toothed core 26 and the windings 24 to facilitate electrical isolation of the winding 24 from the respective core 26. While the segmented stator assembly 12 is illustrated for purposes of disclosure, it is contemplated that the electric motor 10 may include a stator assembly of various other configurations (e.g., an endless (non-segmented) toroidal core having alternative or no core insulation, etc.) and having different shapes.

In the exemplary embodiment, the toothed core 26 includes a solid core. A solid core can be a complete, one-piece component, or can include multiple non-laminated sections coupled together to form a complete solid core. The toothed cores 26 may be formed, for example, and without limitation, from a soft magnetic composite material, a soft magnetic alloy material, and/or a powdered ferrite material. It is noted that the use of soft magnetic composite materials and soft magnetic alloys in a solid core 26 facilitate 3-dimensional flux paths and facilitate reducing high frequency losses (e.g., losses at frequencies above sixty (60)

Hz) when compared with laminated stator yokes. The use of soft magnetic composite materials and soft magnetic alloys also facilitates increasing the structural rigidity of the toothed cores 26, which facilitates improving performance and minimizing noise.

Alternatively, the toothed cores 26 may be formed from a stack of laminations, or the cores may be integrally formed into an annular shape and fabricated from a plurality of laminations in the form of plates stacked one on top of the other. For example, and without limitation, in such a laminated structure, the laminations are stacked or placed in face-to-face contact such that the stack extends axially along the rotation axis "A" a predetermined length. The plurality of laminations may be interlocked (i.e., coupled to each other) or loose laminations. The laminations are fabricated from a magnetically permeable material, such as, for example, a steel or a steel alloy. Additionally, in some embodiments, a laminated stator core may be skewed by angularly offsetting laminations. For example, the skewed design may involve angularly offsetting each lamination a given angle relative to the axially adjacent lamination.

Each exemplary insulator 30 is fabricated from a thermoplastic synthetic resin suitable for use in the electric motor 10. For example, and without limitation, each insulator 30 may be fabricated by injection molding the resin into the shape of the insulator 30. However, it is contemplated that the insulators 30 may be fabricated from any non-conductive material that enables the insulators 30 to function as described herein. Furthermore, the insulators 30 may be fabricated by methods other than molding. For example, they may be fabricated by coating the core or by machining. Each insulator 30 is positioned on a respective toothed core 26 and located between a corresponding winding 24 and the respective core 26. Each insulator 30 may be formed from two identical components coupled together to form a substantially tubular shape that extends radially when positioned on cores 26. In addition, each insulator 30 is coupled to the corresponding core 26 such that the insulator 30 covers the entirety of the radial surfaces of the respective core. That is, each preferred insulator 30 covers substantially the entire core 26 except for a radially inner end surface of the core.

In the exemplary embodiment, as described above, the rotor assembly 14 includes the rotor core 44 coupled to the rotor shaft 42. The rotor core 44 is substantially cylindrical in shape having an outside nominal diameter $D_1$ smaller than an inside diameter $D_2$ of an inner surface 60 of the stator assembly 12. The difference between $D_1$ and $D_2$ defines a first air gap, or basic air gap, of the electric motor 10. In the exemplary embodiment, the rotor core 44 is a permanent-magnet rotor and includes a plurality of substantially rectangular permanent magnets 50. Alternatively, the rotor core 44 is any type of rotor that enables the electric motor 10 to function as described herein. In the exemplary embodiment, the rotor shaft 42 is fixedly coupled to the rotor core 44 and positioned concentrically relative thereto so as to extend along the rotation axis "A." The rotor shaft 42 a first end 52 that extends forward from the rotor core 44 and a shorter second end 54 that extends rearward from the rotor core 44.

While the magnets 50 are describe above as being substantially rectangular, it is noted that alternative magnet shapes are within the ambit of certain aspects of the present invention, as long as the angular relationships of each pole are maintained in accordance with the principles of the present inventions, as described below.

The rotor core 44 and the magnets 50 are configured to rotate with the rotor shaft 42. In the exemplary embodiment, the rotor core 44 may be fabricated from a plurality of laminations 56 (see FIG. 4) stacked or placed in face-to-face contact such that the rotor core 44 extends axially along the rotation axis "A" a predetermined length. The plurality of laminations 56 may be interlocked (i.e., coupled to each other) or loose laminations. Alternatively, in some embodiments, the rotor core 44 may be a solid core, formed without laminations.

In the exemplary embodiment, the rotor core 44 includes a plurality of V-shaped magnet slots 58 extending through the rotor core 44, substantially parallel to the rotation axis "A." The V-shaped magnet slots 58 are circumferentially positioned at substantially regular intervals about the rotation axis "A." Each of the V-shaped magnet slots 58 is configured to receive two of the magnets 50 therein to secure the pair of magnets 50 in a V-shaped arrangement. As will be described, each V-shaped arrangement or V-shaped magnet slot 58 defines a magnetic pole of the rotor assembly 14, meaning the illustrated electric motor 10 is a ten (10) pole motor. The illustrated embodiment includes ten (10) V-shaped magnet slots 58, thus defining ten (10) pole sectors 62. It is noted that the rotor core 44 may include more or fewer pole segments, depending on the electric motor design requirements. It is also noted that the magnets 50 are shown schematically for purposes of illustration but are generally sized to fit tightly within the V-shaped magnet slots 58 to facilitate a secure, non-moving fit with the rotor core 44. Additionally, or alternatively, the magnets 50 may be secured in the V-shaped magnet slots 58 with adhesive, fasteners, etc.

Figure 4:
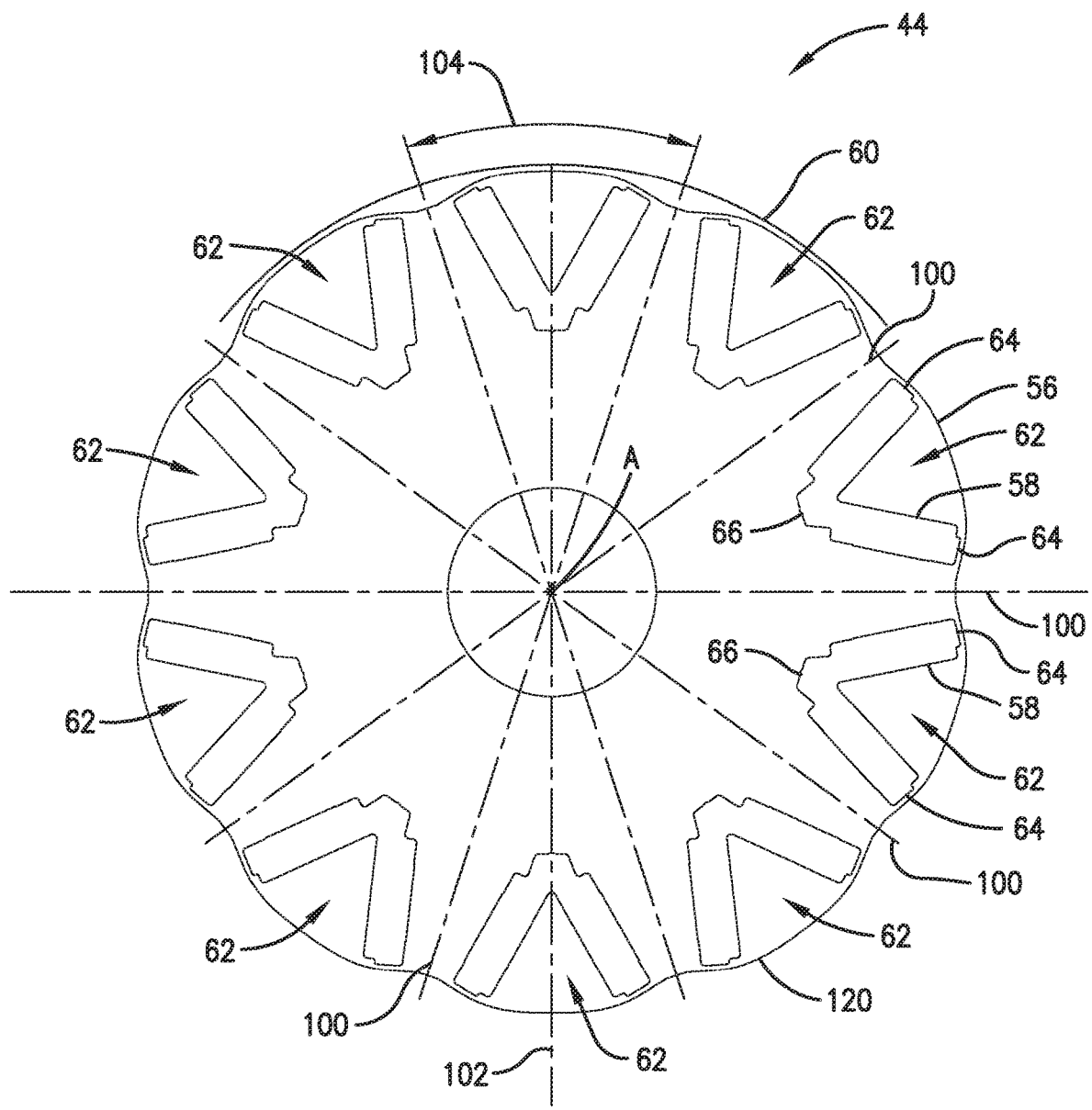
FIG. 4 is an enlarged cross-sectional view of the rotor of in the electric motor shown in FIGS. 1 and 2, particularly illustrating a lamination of the rotor core.

FIG. 4 is an enlarged cross-sectional view of the rotor core 44, particularly illustrating one of the laminations 56. As described above, in the exemplary embodiment, the lamination 56 defines ten (10) pole sectors 62. End portions 64 of each of the V-shaped magnet slots 58 are positioned radially outward from the rotation axis "A" of the rotor assembly 14, which is shown as the center of the lamination 56. A vertex 66 of each of the V-shaped magnet slots 58 is thus positioned radially inward. A plurality of radial pole pitch lines 100 extend through the center of the lamination 56 (i.e., rotation axis "A"), with each radial pole pitch line 100 being centered angularly between an adjacent pair of the V-shaped magnet slots 58 such that the adjacent pair of the V-shaped magnet slots 58 are disposed symmetrically about the respective radial pole pitch line 100. Each radial pole pitch line 100 defines the boundary between two adjacent pole sectors 62, wherein adjacent radial pole pitch lines 100 define a pole sector 62. Each pole segment includes a central pole axis 102 that passes through the center of the lamination 56 and bisects the respective pole sector 62 (i.e., is angularly centered between adjacent radial pole pitch lines 100). In FIG. 4, only the vertical-most central pole axis 102 is shown for clarity.

As used herein, a pole pitch angle is defined as the angle between identical points on two adjacent pole sectors 62. For example, and without limitation, a pole pitch angle 104 of the lamination 56 is illustrated in FIG. 4 as the angle between adjacent radial pole pitch lines 100, where the central pole axis 102 is positioned between the adjacent radial pole pitch lines 100 at an angle equal to one-half of the pole pitch angle 104. The pole pitch angle is determined by dividing three hundred and sixty degrees)(360° (one full turn of the rotor) by the number of pole sectors 62 of the rotor core 44. For example, in the exemplary embodiment, the ten (10) pole rotor core has a pole pitch angle 104 equal to thirty-six degrees (36°), i.e. three hundred and sixty degrees (360°) divided by ten (10) poles.

Figure 5:
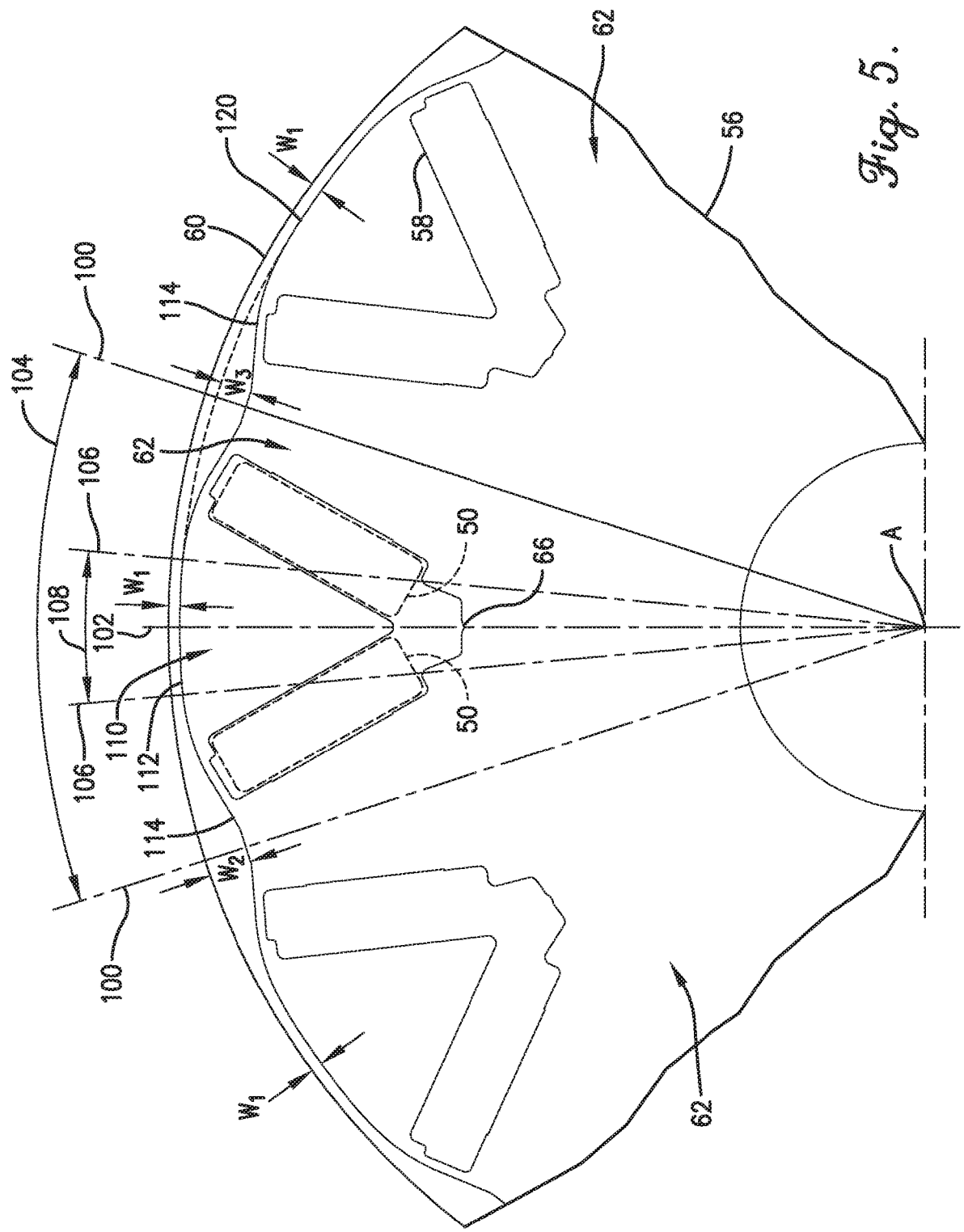
FIG. 5 is an enlarged view of a portion of the lamination shown in FIG. 4, illustrating the configuration of one of the V-shaped magnet slots with respect to a respective pole sector.

FIG. 5 is an enlarged view of a portion of the lamination 56 shown in FIG. 4, illustrating the configuration of a V-shaped magnet slot 58 with respect to a respective pole sector 62. In the exemplary embodiment, radial lines 106 extend through the center of the lamination 56 (i.e., rotation axis "A"), with each radial line 106 passing through a radially-outward, inwardly-facing corner of a respective magnet 50 (inwardly facing refers to the inner portion of the V-shaped magnet slot 58). The two respective lines 106 of a V-shaped magnet slot 58 define a mechanical pole angle 108 of a pole 110 of the rotor assembly 14. As used herein, the pole 110 is a magnetic pole of the rotor defined as the active or effective magnet pole area of the V-shaped magnet arrangement. In the exemplary embodiment, the effective magnet pole area is equal to an arc or segment 112 (also referred to as a pole segment) of the rotor core surface spanning the mechanical pole angle 108. As shown in FIG. 4, the central pole axis 102 bisects the mechanical pole angle 108 and the V-shaped magnet slot 58. That is, the vertex of the V-shaped magnet slot 58 lies on the central pole axis 102, and the V-shaped magnet slot is disposed such that it is symmetric with the central pole axis 102.

Referring to FIGS. 4 and 5, in the exemplary embodiment, the rotor core 44, or the laminations 56 that make up a stacked rotor core 44, includes an outer surface contour 120. The outer surface contour 120 includes a plurality of circumferentially-alternating first and second segments 112 and 114, respectively. The outer surface contour 120 defines a plurality of axially extending recesses 116 (shown in FIG. 1) of the rotor core 44. More particularly, each second segment 114 of the outer surface contour 120 defines one of the recesses 116. The first segments 112 are arcuate in shape (preferably extending along a common arc that defines the rotor nominal outside diameter $D_1$), and each first segment 112 spans the corresponding mechanical pole angle 108. The first segments 112 are substantially centered on the rotation axis "A" of the rotor assembly 14 to define the nominal outside diameter $D_1$. As such, the first segments 112 provide a substantially uniform air gap width $W_1$ between the inner surface 60 of the stator assembly 12 and the first segments 112. The second segments 114 span the distance between adjacent first segments 112. The second segments 114 are substantially the same in shape and form, being generally arcuately concave with respect to the inner surface 60 of the stator assembly 12. As such, the second segments 114 provide a substantially non-uniform air gap between the inner surface 60 of the stator assembly 12 and the second segments 114. Most preferably, the second segments 114 are each at least substantially centered on a respective radial pole pitch line 100 and are symmetric thereabout.

The non-uniform air gap varies from the air gap width $W_1$, corresponding to the intersection of one of the second segments 114 with one of the first segments 112 of the first pole 110, to a maximum air gap width of $W_2$ (at a midpoint of the second segment 114) and back to the air gap width $W_1$, corresponding to the intersection of the second segment 114 with an adjacent first segment 112 of an adjacent second pole 110. The non-uniform air gap width $W_2$ facilitates increasing the saliency of the rotor assembly 14 by reducing flux leakage from the rotor assembly 14 to the stator assembly 12 and increasing reluctance at the space between the poles 110. In one suitable embodiment, the maximum distance the second segments 114 extend radially inward a distance of at least two-hundredths of an inch (0.02") relative to the first segments 112, as indicated by $W_3$.

In the exemplary embodiment, the mechanical pole angle 108 is in the range between about forty-seven percent (47%) and about fifty-three percent (53%) of the pole pitch angle 104. In the illustrated embodiment, the rotor core 44 is a ten (10) pole rotor. As such, the mechanical pole angle 108 is in the range between about seventeen degrees (17°) and about nineteen degrees (19°) for the ten pole rotor. This facilitates increasing the flux density within the span of the mechanical pole angle 108, which has the effect of increasing the back electromotive force (or "back emf") of the electric motor 10 for the same magnet volume. This back emf increase for the same magnet volume facilitates generating more effective power from the electric motor 10. The non-uniform air gap width $W_2$ facilitates focusing the flux density through the first segment 112 areas of the rotor core 44 defined by the mechanical pole angle 108, which increases the operating efficiency and reducing current load of the electric motor 10.

The angles discussed above are geometric and are expressed as mechanical degrees. For the design of electric motors, electrical degrees are also employed so that results can be generalized. It is noted that each pole pitch angle (or pole sector 62) of the electric motor 10 is equal to one-hundred and eighty electrical degrees (180° electrical), as the magnetic poles are one-hundred and eighty electrical degrees (180° electrical) apart. An electrical degree is a unit of measurement of time as applied to alternating current—one complete cycle equals three-hundred and sixty electrical degrees (360° electrical). For example, one cycle in a rotating electric motor is accomplished when the rotating field moves from one pole to the next pole of the same polarity. There are three-hundred and sixty electrical degrees (360° electrical) in this time period. Therefore, in a two (2) pole (one (1) pole pair) electric motor there are three-hundred and sixty electrical degrees (360° electrical) in one revolution, and the electrical and mechanical degrees are equal. In a machine with more than two (2) poles, the number of electrical degrees per revolution is obtained by multiplying the number of pole pairs by three hundred and sixty degrees (360°). Thus, in the exemplary embodiment, the electric motor 10 includes ten (10) poles, or five (5) pole pairs and the number of electrical degrees is equal to one thousand and eight hundred (1800° electrical), i.e., five (5) pole pairs times three-hundred and sixty electrical degrees (360° electrical). As such, each mechanical degree of rotation of the electric motor 10 is equal to five (5) electrical degrees, i.e., one thousand and eight hundred (1800° electrical) divided by three hundred and sixty degrees (360°).

As described above, the effective magnet pole area is equal to the arc or span of the segment 112. In the exemplary embodiment, the effective magnet pole area is in a range between and including about eighty-five electrical degrees (85° electrical) and about ninety-five electrical degrees (95° electrical), where the pole sector 62 spans one hundred and eighty electrical degrees (180° electrical). As such, the mechanical pole angle 108 may be determined by the following equation:

$$(360 \div \text{No. of rotor poles}) \times (\text{effective magnet pole area} \div 180)$$

Where "No. of rotor poles" equals the number of poles 110 (or pole sectors 62) of the rotor core 44 and the "effective magnet pole area" is in the range of 85° electrical to 95° electrical. In the illustrated embodiment, the rotor core 44 is a ten (10) pole rotor. As such, the mechanical pole angle 108 is in the range between and including about seventeen degrees (17°) and about nineteen degrees (19°). In other words, the most preferred mechanical pole angle 108 for the illustrated electric motor 10 is about one-half (½) of three hundred and sixty (360) divided by ten (10) poles.

Figure 6:
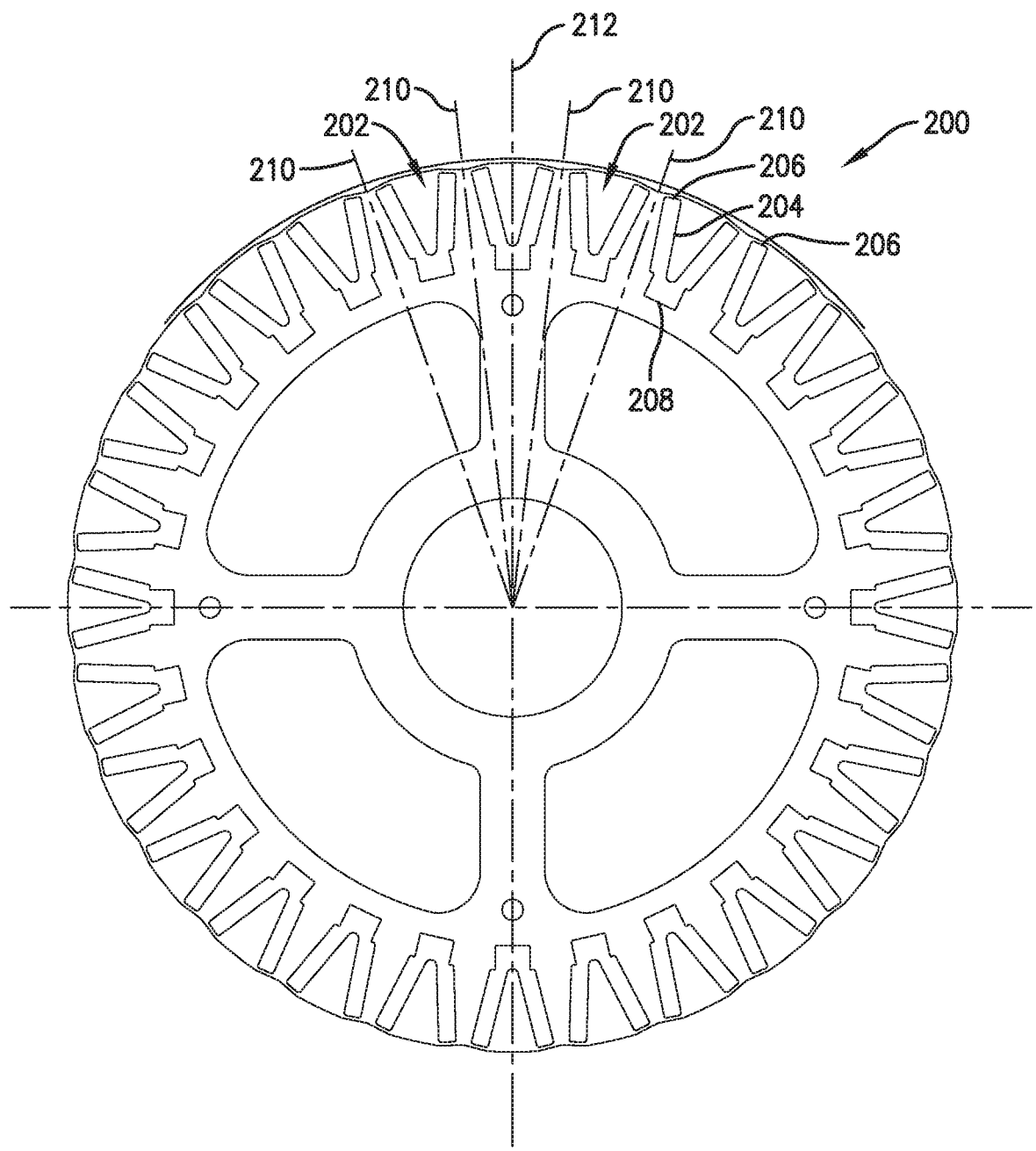
FIG. 6 is an enlarged cross-sectional view of a rotor core constructed in accordance with a second embodiment of the invention, particularly illustrating an alternative laminated design.

FIG. 6 is a schematic view of an alternative lamination 200 constructed in accordance with another embodiment of the present invention. In this second embodiment, the lamination 200 defines twenty-eight (28) pole sectors 202, each of which includes a V-shaped magnet slot 204, substantially parallel to the rotation axis "A." The V-shaped magnet slots 204 are circumferentially positioned at substantially regular intervals about the rotation axis "A." Each of the V-shaped magnet slots 204 is configured to receive two permanent magnets therein, such as magnets 50 (not shown in FIG. 6). End portions 206 of each of the V-shaped magnet slots 204 are positioned radially outward from the rotation axis "A." A vertex 208 of each of the V-shaped magnet slots 204 is thus positioned radially inward. A plurality of radial pole pitch lines 210 extend through the center of the lamination 200 (i.e., rotation axis "A"), with each radial pole pitch line 100 being centered angularly between an adjacent pair of the V-shaped magnet slots 204 such that the adjacent pair of the V-shaped magnet slots 204 are disposed symmetrically about the respective radial pole pitch line 210. Each radial pole pitch line 100 defines the boundary between two adjacent pole sectors 202, wherein adjacent radial pole pitch lines 210 define a pole sector 202. Each pole segment includes a central pole axis 212 (only one (1) shown in FIG. 6 for clarity) that passes through the center of the lamination 200 and bisects the respective pole sector 202 (i.e., is angularly centered between adjacent radial pole pitch lines 210).

Figure 7:
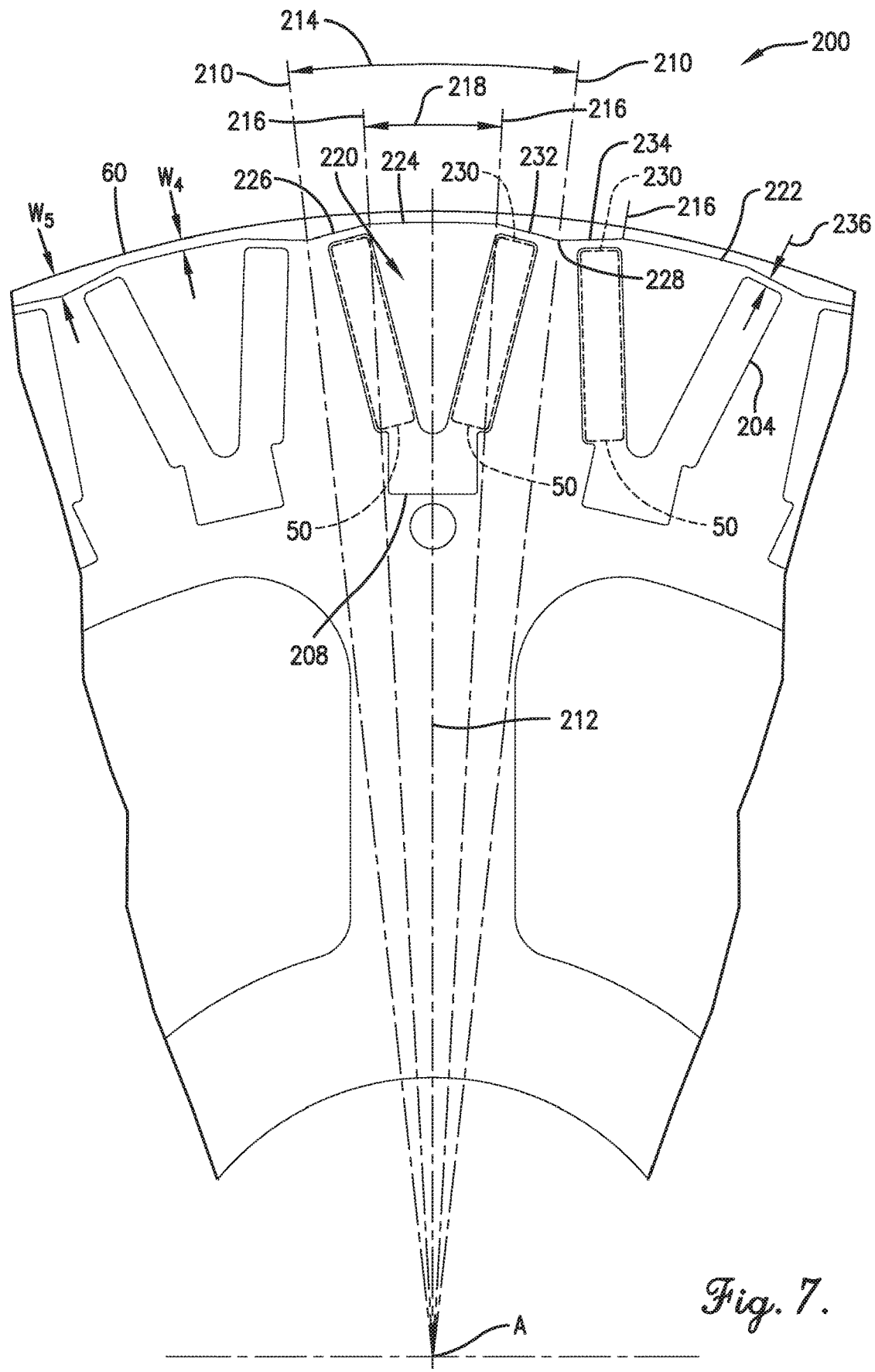
FIG. 7 is an enlarged view of a portion of the lamination shown in FIG. 6, illustrating the configuration of one of the V-shaped magnet slots with respect to a respective pole sector.

FIG. 7 is an enlarged view of a portion of the lamination 200 shown in FIG. 6, illustrating the configuration of the V-shaped magnet slot 204 with respect to a respective pole sector 202. A pole pitch angle 214 is as the angle between adjacent radial pole pitch lines 210, where the central pole axis 212 is positioned between the adjacent radial pole pitch lines 210 at an angle equal to one-half of the pole pitch angle 214.

In this second embodiment, the radial lines 216 extend through the center of the lamination 200, with each radial line 216 passing through a radially-outward, inwardly-facing corner of a respective magnet 50. The two respective lines 216 of a V-shaped magnet slot 204 define a mechanical pole angle 218 of a pole 220. The central pole axis 212 bisects the mechanical pole angle 218 and the V-shaped magnet slot 204. That is, the vertex 208 of the V-shaped magnet slot 204 lies on the central pole axis 212, and the V-shaped magnet slot is disposed such that it is symmetric with the central pole axis 212.

The lamination 200 includes an outer surface contour 222, which includes a plurality of circumferentially-alternating first and second segments 224 and 226, respectively. The outer surface contour 222 defines a plurality of axially extending recesses, such as the recesses 116 (shown in FIG. 1), of the rotor core 44. More particularly, each second segment 226 of the outer surface contour 222 defines one of the recesses 116. The first segments 224 are arcuate in shape (preferably extending along a common arc that defines the rotor nominal outside diameter $D_1$), and each first segment 224 spans the corresponding mechanical pole angle 218. The first segments 224 are substantially centered on the rotation axis "A" of the rotor assembly 14 to define the nominal outside diameter $D_1$. As such, the first segments 224 provide a substantially uniform air gap width $W_4$ between the inner surface 60 of the stator assembly 12 and the first segments 224. The second segments 226 span the distance between adjacent first segments 224. The second segments 226 are substantially the same in shape and form. More specifically, each second segment 226 is generally V-shaped segment with respect to the inner surface 60 of the stator assembly 12. Each second segment 226 most preferably has a vertex 228 that is centered on a respective radial pole pitch line 210.

Each of the magnets 50 present a generally flat, radially outer magnet end 230 opposite the vertex 228. Each of the V-shaped second segments 226 include a first section 232 that is parallel to a magnet end 230 of a first pole sector 202, and a second section 234 that is parallel to a magnet end 230 of an adjacent pole sector 202. The first and second sections 232 and 234 are spaced a distance 236 from the respective magnet ends 230. In one preferable embodiment, the distance 236 is at least twenty-five thousandths of an inch (0.025"), although other suitable distances are within the ambit of certain aspects of the present invention.

The non-uniform air gap varies from the air gap width $W_4$, corresponding to the intersection of one of the second segments 226 with one of the first segments 224 of the first pole 220, to a maximum air gap width of $W_5$ (at a midpoint of the second segment 226) and back to the air gap width $W_4$, corresponding to the intersection of the second segment 226 with an adjacent first segment 224 of an adjacent second pole 220. The non-uniform air gap width $W_4$ facilitates increasing the saliency of the rotor assembly 14 by reducing flux leakage from the rotor assembly 14 to the stator assembly 12 and increasing reluctance at the space between the poles 220. In one suitable embodiment, the second segments 226 extend radially inward a distance of at least two-hundredths of an inch (0.02") relative to the first segments 224.

An effective magnet pole area of each pole 220 is equal to the arc or span of the first segment 224. In this second embodiment, the effective magnet pole area is in a range between and including about eighty-five electrical degrees (85° electrical) and about ninety-five electrical degrees (95° electrical), where the pole sector 202 spans one hundred and eighty electrical degrees (180° electrical). As such, the mechanical pole angle 218 may be determined by the following equation:

$$(360 \div \text{No. of rotor poles}) \times (\text{effective magnet pole area} \div 180)$$

Where "No. of rotor poles" equals the number of poles 220 (or pole sectors 202) of the rotor core and the "effective magnet pole area" is in the range of 85° electrical to 95° electrical. In the illustrated embodiment, the rotor core is a twenty-eight (28) pole rotor. As such, the mechanical pole angle 218 is in the range between and including about six point one (6.1°) and about six point eight degrees (6.8°). In other words, the most preferred mechanical pole angle 218 for this second embodiment of the electric motor 10 is about one-half (½) of three hundred and sixty (360) divided by twenty-eight (28) poles.

Described herein are embodiments of an electric motor with an improved V-slot rotor having poles with a magnet angle producing more back emf per turn at lower flux density. The electric motor also includes rotor surface enhancements that facilitate increasing flux density at the rotor poles. One advantage of the disclosed electric motor includes improving torque/amp linearity by almost 20+% at peak current levels over typical known V-slot motors. The disclosed V-slot rotor has an effective magnetic pole angle between eighty-five degrees electrical (85° electrical) to ninety-five degrees electrical (95° electrical), which is advantageous in that it facilitates increasing the volt/turn back emf. Another advantage is that the disclosure provides an electric motor with increased motor efficiency and reduced current load.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electric motor comprising:
a stator; and
a rotor rotatable relative to the stator, the rotor including a plurality of poles,
each of said poles defined by a pair of magnets positioned relative to each other in a V-shaped arrangement having a vertex positioned radially inward,
each of said poles including a mechanical pole angle defined by the pair of magnets,
each of said poles being disposed within a rotor pole sector defined by a pole pitch angle,
each of said rotor pole sectors corresponding to one hundred and eighty (180) electrical degrees,
said mechanical pole angle being about one-half (½) of three hundred and sixty (360) divided by the number of the poles,
said mechanical pole angle being in a range between forty-seven percent (47%) and fifty-three percent (53%) of the pole pitch angle.

2. The electric motor in accordance with claim 1,
each of said rotor pole sectors being defined between a first radial pole pitch line and a second radial pole pitch line,
said radial pole pitch lines cooperatively defining therebetween the pole pitch angle,
each of said rotor pole sectors having a central pole axis,
said rotor defining a rotation axis,
said central pole axis and said radial pole pitch lines intersecting and being normal to the rotation axis,
said central pole axis bisecting its respective rotor pole sector.

3. The electric motor in accordance with claim 2,
said central pole axis bisecting the V-shaped arrangement of magnets.

4. The electric motor in accordance with claim 1,
said magnets being substantially the same size and shape.

5. The electric motor in accordance with claim 1,
each of said poles being disposed within a rotor pole sector defined by a pole pitch angle,
each of said rotor pole sectors having a central pole axis bisecting its respective rotor pole sector,
said magnets being positioned within the rotor such that the magnets are symmetrical with respect to the central pole axis.

6. The electric motor in accordance with claim 1,
said rotor being formed from a plurality of laminations stacked in an axial direction.

7. The electric motor in accordance with claim 1,
each of said poles having a central pole axis centered relative to the pole,
said rotor including an outer surface and a plurality of axially extending recesses defined in the outer surface, and
each respective recess positioned between adjacent central pole axes.

8. The electric motor in accordance with claim 1,
each of said poles being centered within a respective rotor pole sector defined between an adjacent pair of radial pole pitch lines,
said rotor including an outer surface and a plurality of axially extending recesses defined in the outer surface, and
each respective recess being centered about a respective radial pole pitch line.

9. An electric motor comprising:
a stator; and
a rotor rotatable relative to the stator,
said rotor including a plurality of poles, each of which is defined by a pair of magnets positioned relative to one another in a V-shaped arrangement with a vertex positioned radially inward,
said V-shaped arrangement defining a mechanical pole angle,
first and second radial pole pitch lines being defined between each pole and circumferentially adjacent first and second ones of the poles, such that the poles are arranged along a pole pitch angle defined between the first and second pole pitch lines,
each of said poles being centered relative to the first and second radial pole pitch lines, with the mechanical pole angle being greater than about forty-seven percent (47%) of the pole pitch angle and less than about fifty-three percent (53%) of the pole pitch angle.

10. The electric motor in accordance with claim 9,
each of said poles having a central pole axis centered relative to the first and second radial pole pitch lines,
said central pole axis intersecting the vertex of the V-shaped arrangement of magnets.

11. The electric motor in accordance with claim 10,
said central pole axis bisecting the V-shaped arrangement of magnets.

12. The electric motor in accordance with claim 10,
said magnets being substantially the same size and shape.

13. The electric motor in accordance with claim 9,
each of said poles having a central pole axis centered relative to the first and second radial pole pitch lines, with the pair of magnets of each pole being symmetrical with respect to the central pole axis.

14. The electric motor in accordance with claim 9,
each of said poles having a central pole axis centered relative to the first and second radial pole pitch lines,
said rotor including an outer surface and a plurality of axially extending recesses defined in the outer surface,
each respective recess positioned between adjacent central pole axes.

15. The electric motor in accordance with claim 9,
said rotor being formed from a plurality of laminations stacked in an axial direction.

16. An electric motor comprising:
a stator; and
a rotor rotatable relative to the stator, the rotor including a plurality of poles,
each of said poles defined by a pair of magnets positioned relative to each other in a V-shaped arrangement having a vertex positioned radially inward, each of said poles including a mechanical pole angle defined by the pair of magnets, each of said poles being disposed within a rotor pole sector defined by a pole pitch angle, each of said rotor pole sectors corresponding to one hundred and eighty (180) electrical degrees, said mechanical pole angle being about one-half (½) of three hundred and sixty (360) divided by the number of the poles, said mechanical pole angle being in a range between eighty-five (85) and ninety-five (95) electrical degrees.

17. The electric motor in accordance with claim 16, each of said poles having a central pole axis centered relative to the pole, said rotor including an outer surface and a plurality of axially extending recesses defined in the outer surface, and each respective recess positioned between adjacent central pole axes.

18. The electric motor in accordance with claim 16, each of said poles being centered within a respective rotor pole sector defined between an adjacent pair of radial pole pitch lines, said rotor including an outer surface and a plurality of axially extending recesses defined in the outer surface, and each respective recess being centered about a respective radial pole pitch line.

19. An electric motor comprising:

a stator; and a rotor rotatable relative to the stator, said rotor including a plurality of poles, each of which is defined by a pair of magnets positioned relative to one another in a V-shaped arrangement with a vertex positioned radially inward, said V-shaped arrangement defining a mechanical pole angle, first and second radial pole pitch lines being defined between each pole and circumferentially adjacent first and second ones of the poles, such that the poles are arranged along a pole pitch angle defined between the first and second pole pitch lines, each of said poles being centered relative to the first and second radial pole pitch lines, with the mechanical pole angle being less than about fifty-three percent (53%) of the pole pitch angle, adjacent pairs of said first and second pole pitch lines defining respective rotor pole sectors, each of said rotor pole sectors corresponding to one hundred and eighty (180) electrical degrees, said mechanical pole angle being in a range between eighty-five (85) and ninety-five (95) electrical degrees.

20. The electric motor in accordance with claim 19, each of said poles having a central pole axis centered relative to the first and second radial pole pitch lines, said rotor including an outer surface and a plurality of axially extending recesses defined in the outer surface, each respective recess positioned between adjacent central pole axes.

\* \* \* \* \*